United States Patent
Colineau et al.

(10) Patent No.: US 6,977,875 B1
(45) Date of Patent: Dec. 20, 2005

(54) TRACKING SYSTEM FOR RECORDING/READING A DATA MEDIUM AND RECORDING MEDIUM

(75) Inventors: Joseph Colineau, Bures sur Yvette (FR); Christian Claudepierre, Athis-Mons (FR); Michel Audoin, Villeneuve St Georges (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/019,277

(22) PCT Filed: Jul. 9, 1999

(86) PCT No.: PCT/FR99/01690

§ 371 (c)(1),
(2), (4) Date: Jan. 2, 2002

(87) PCT Pub. No.: WO01/04879

PCT Pub. Date: Jan. 18, 2001

(51) Int. Cl.⁷ .............................................. G11B 7/00
(52) U.S. Cl. .............................. 369/44.34; 369/275.3; 369/53.42
(58) Field of Search ................... 369/59.32, 44.34, 369/275.3; G11B 5/58, 7/00

(56) References Cited

U.S. PATENT DOCUMENTS

| | | | |
|---|---|---|---|
| 3,810,233 A | * 5/1974 | Besenfelder | 360/42 |
| 5,189,579 A | 2/1993 | Colineau | |
| 5,227,938 A | 7/1993 | Colineau et al. | |
| 5,282,104 A | 1/1994 | Coutellier et al. | |
| 5,335,120 A | 8/1994 | Colineau et al. | |
| 5,406,427 A | * 4/1995 | Shimoda | 360/51 |
| 5,420,734 A | 5/1995 | Colineau et al. | |
| 5,455,719 A | 10/1995 | Kawakami et al. | |
| 5,459,619 A | 10/1995 | Colineau et al. | |
| 5,493,553 A | 2/1996 | Maurice et al. | |
| 5,546,255 A | 8/1996 | Colineau | |
| 5,570,248 A | 10/1996 | Ido et al. | |
| 5,640,285 A | 6/1997 | Maurice et al. | |
| 5,701,283 A | 12/1997 | Alon et al. | |
| 5,703,845 A | 12/1997 | Audoin et al. | |
| 5,796,710 A | 8/1998 | Maurice et al. | |
| 5,812,333 A | 9/1998 | Colineau | |
| 5,838,743 A | 11/1998 | Colineau et al. | |
| 5,854,810 A | * 12/1998 | Denissen et al. | 375/242 |
| 5,870,361 A | 2/1999 | Audoin | |
| 5,894,386 A | 4/1999 | Colineau | |
| 5,920,448 A | 7/1999 | Colineau | |
| 5,963,525 A | 10/1999 | Audoin et al. | |
| 5,986,834 A | 11/1999 | Colineau et al. | |

* cited by examiner

*Primary Examiner*—A M Psitos
(74) *Attorney, Agent, or Firm*—Oblon, Spivak, McClelland, Maier & Neustadt, P.C.

(57) ABSTRACT

The invention relates to a system for reading a magnetic medium having several tracks of data which can be read in parallel with a detection device having at least as many detectors as there are tracks, making it possible to read simultaneously and at regular intervals a sample of data on each track. This system furthermore includes a processing circuit configured to receive each sample of data to be processed from each track together with sample of a first adjacent track and sample of a second adjacent track and to calculate the cross-talk affecting the sample of data to be processed due to the adjacent tracks. An integration circuit configured to receive the cross-talk value calculated by the processing circuit, integrates these values at each read time, and at subsequent read times. The systems also include a relative track-following control circuit configured to receive the result of integration of the integrator circuit and to supply a track-following control signal for the detection device.

9 Claims, 5 Drawing Sheets

FIG.8 ically, that is to say that it allows the proper centering of the photosensitive elements of the read detector (pixels) on the center of the# TRACKING SYSTEM FOR RECORDING/READING A DATA MEDIUM AND RECORDING MEDIUM This application is a 371 of PCT/FR99/01690 Jul. 9, 1999.

The invention relates to a track-following system for the recording/reading of a data medium, especially for a multitrack data medium such as a magnetic tape with multitracks placed longitudinally over the tape.

The invention is applicable especially to reading magnetic or optical recordings and, in this context, to the reading of a high-density recording. It is preferably applicable in recording systems such as computing peripherals and all professional systems.

The invention can be extended to recordings on optical tape and on magnetic or optical disk, when it is desired to read several tracks in parallel therefrom.

High-density recording on parallel tracks presents a twofold problem for track following and separation rereading. The small width of the tracks (less than 20 $\mu$m) means that it is difficult on reading a tape to ensure the accuracy of track following on the basis of the single mechanical guidance at the edge of the tape.

The need to guarantee the interoperability of the tapes and of the readers aggravates this difficulty.

Moreover, obtaining a high signal-to-noise ratio on reading requires rereading the entire track width, which excludes the existence of a barrier between tracks and induces track-to-track reading cross-talk phenomena.

The increase of the longitudinal track density of linear record/read systems makes it necessary to put in place high-performance track-following systems, making it possible to position the read system facing tracks written with a small residual error compared to the positioning, that is to say that it allows the proper centering of the photosensitive elements of the read detector (pixels) on the center of the reread tracks. It is completed by a second device which prepares an error signal if the relative positioning does not make the pixel j correspond to the track j.

The invention supplies a system which has a shorter response time than the known systems and which allows a faster track-following correction. Furthermore, this system is less restrictive for the recording format.

The invention therefore relates to a system for reading a magnetic medium having several tracks of data which can be read in parallel, and comprising a detection device having at least as many detectors as there are tracks, making it possible to read simultaneously and at regular intervals a sample of data on each track, said detection device having a parallel/series shift register receiving in parallel the samples of data read by the detectors at each read time and retransmitting them in series form, characterized in that it comprises:

a processing circuit receiving each sample of data to be processed from each track, together with the sample of a first adjacent track and the sample of a second adjacent track, multiplying the value of said sample to be processed:
by +1 when the sample of the first adjacent track is negative and the sample of the second adjacent track is positive;
by −1 when the sample of the first adjacent track is positive and the sample of the second adjacent track is negative;
by 0 when the samples of the adjacent tracks are of the same sign;

an integration circuit receiving each sample value thus multiplied, integrating said values obtained at each read time, then integrating the values obtained at following read times;
a relative track-following control circuit receiving the result of integration of the integrator circuit and supplying a track-following control signal for the detection device.

The invention also relates to a recording medium comprising several tracks recordable in parallel, characterized in that said tracks each comprise a preamble zone recorded or recordable in parallel, said zones containing data making it possible to locate the tracks one with respect to the others.

The various objects and characteristics of the invention will become more clearly apparent in the following description made by way of example and in the appended figures which show.

According to the invention, the function of preparing the error signal is independent of the cross-talk correction system, which makes the independent optimization of the two functions possible. Moreover, the absolute positioning method no longer requires the use of a particular modulation code to which violations have just been made, but is based on independent zones of the data zones, thus making it possible to use any type of modulation code adapted to the channel. The L1 particular signals used for the absolute positioning may be chosen according to the overall performance desired (time for detecting the absolute position). Finally, absolute and relative positions are now dissociated, which makes a much shorter establishment time possible.

The general operation is as follows:
the read system has a greater number of elements (pixels) than the number of tracks;
the relative positioning loop aligns the pixels on the closest tracks;
a system for detecting absolute position determines where the physical tracks are located or, which is equivalent, indicates the number of the pixel corresponding to the first track (track 0);
the read electronics processes the signals from all the pixels;
the position data of the tracks is transmitted to the electronics for processing decoded data, which, itself, only processes the data from the physical tracks.

Figure 1:
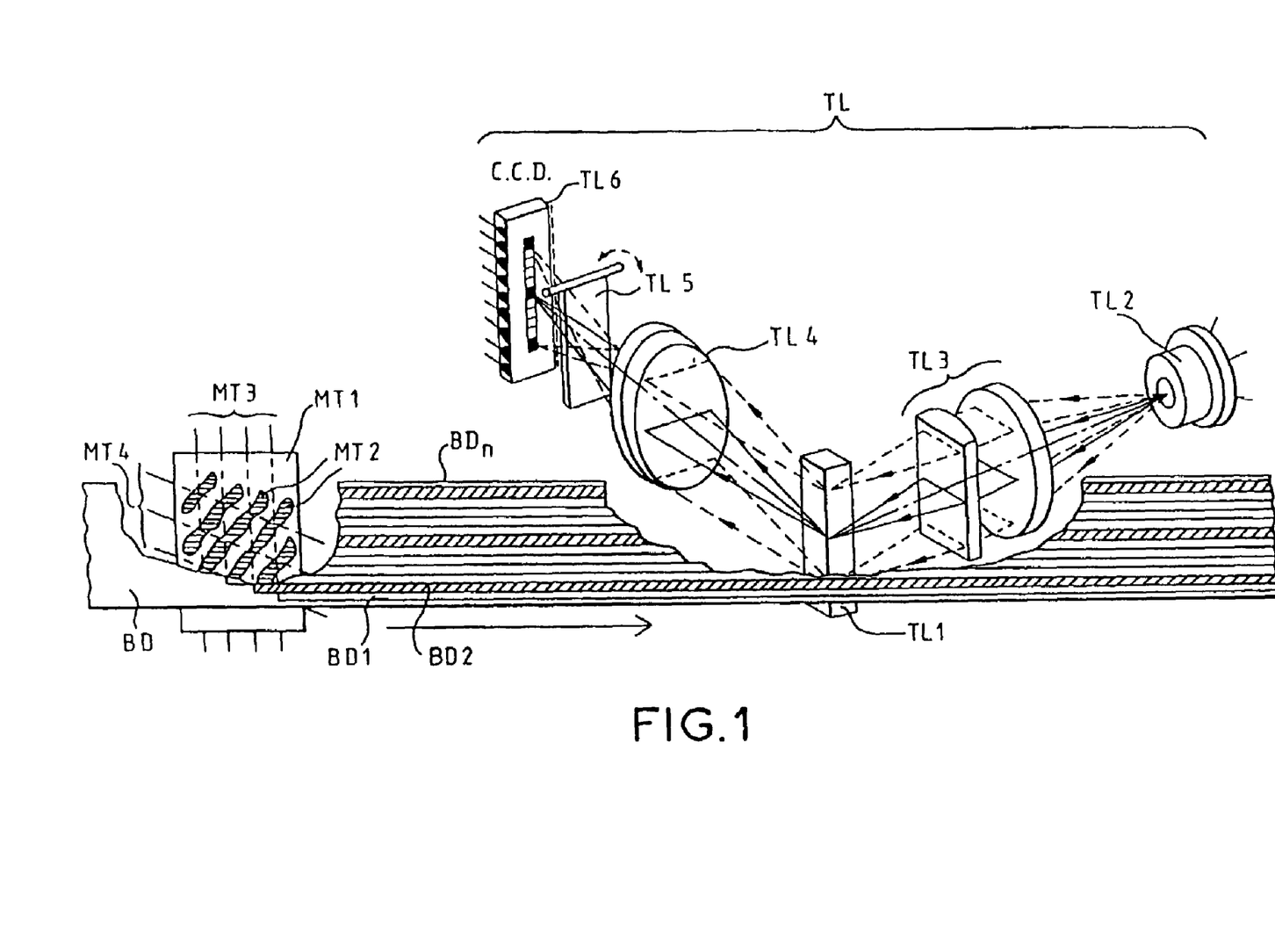
FIG. 1, a magnetic tape read system known in the prior art.
Figure 2:
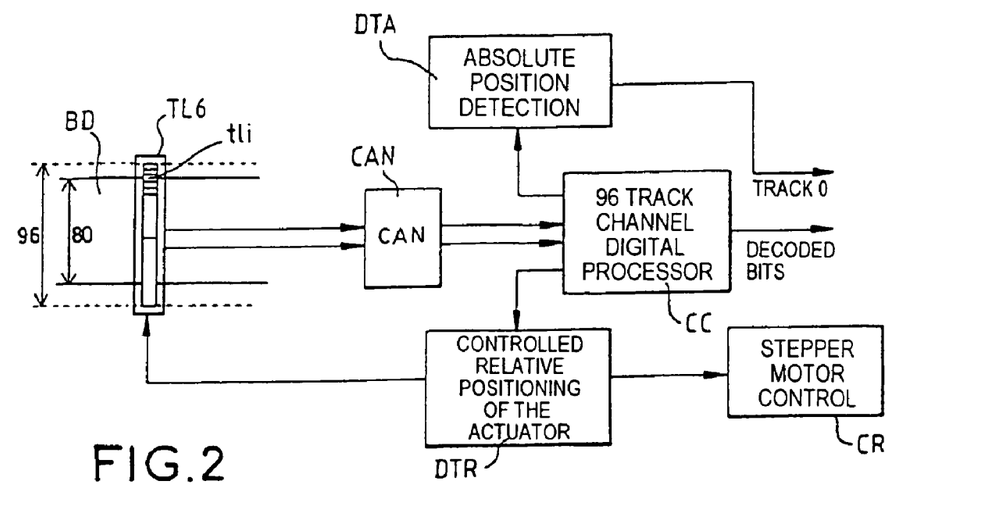
FIG. 2, a general exemplary embodiment of the system of the invention.

FIG. 2 shows a general diagram of the system of the invention. This system comprises a detection device TL6 comprising a row of detectors tli. The width of this row of detectors is wider than the width of the tape BD to be read. For example, as indicated in FIG. 2, for 80 tracks, the detector device TL6 comprises 96 detectors tli. The detector device TL6 comprises in a known manner a circuit CCD (not shown) making it possible to transmit the signals detected on the tracks to the processing circuits. These processing circuits comprise an analog-digital converter CAN and a digital processor CC capable of processing the data from the 96 detectors. A circuit DTR for positioning the detection device with respect to the tracks is combined with the processor CC and controls a system TL5 for controlling the position of the detection device with respect to the tracks. A circuit DTA for detecting the absolute position of the detectors with respect to the tracks is also combined with the processor in order to indicate the relationship of the position of the detectors with respect to the tracks.

First of all, we will describe the design and an exemplary embodiment of the relative positioning circuit DTR.

In an ideal multitrack read system, each read element i delivers, at time k, a signal $X_{i(k)}$ proportional to the symbol $a_{i(k)}$ written on this track.

In practice, the read signal undergoes deformations owing to

1—the presence of noise $b_{(k)}$
2—interference between successive symbols of one and the same track (intersymbol interference) as a result of the limited bandwidth of the channel
3—interference between adjacent track symbols (intertrack cross-talk) as a result of separation faults between tracks of the read system
4—interference between symbols of adjacent tracks as a result of faults in positioning and guiding of the recording medium or of the read/write heads.

Figure 3:
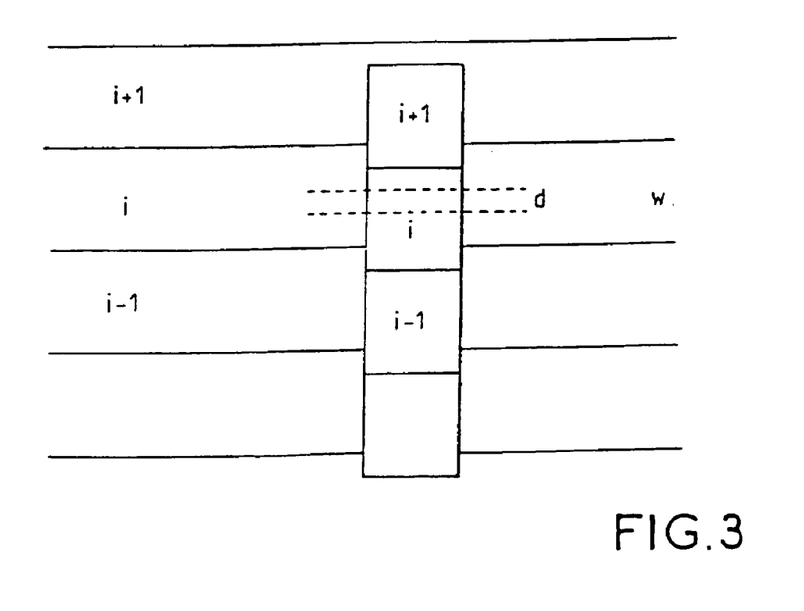
FIG. 3, an example of positioning detectors with respect to the tracks of a magnetic tape.

FIG. 3 shows a set of parallel tracks of width w, and the read system, positioned with a separation d with respect to the optimum position.

The read signal of the head element i at time k is equal to:

$$x_{i(k)} = \left(1 - \frac{d}{w}\right) \cdot a_{i(k)} + \frac{d}{w} \cdot a_{i-1(k)} + b_{(k)}$$

Let us assume that the signal $a_{i-1(k)}$ written on the track i−1 is known. It is possible to calculate the intercorrelation of $X_{i(k)}$ and of $a_{i-(k)}$.

$$C_{i,i-1} = \frac{1}{N} \sum_k x_{i(k)} \cdot a_{i-1(k)}$$

$$C_{i,i-1} = \frac{1}{N} \sum \left[\left(1 - \frac{d}{w}\right) \cdot a_i + \frac{d}{w} a_{i-1(k)} + b_{(k)}\right] a_{i-1(k)}$$

$$C_{i,i-1} = \frac{1}{N} \sum \left[\left(1 - \frac{d}{w}\right) \cdot a_{i(k)} \cdot a_{i-1(k)} + \frac{1}{N} \sum \frac{d}{w} \cdot a_{i-1(k)} \cdot a_{i-1(k)} + \frac{1}{N} \sum b_{(k)} \cdot a_{i-1(k)}\right]$$

The first term represents the intercorrelation of the signals written on the tracks i and i−1. If the signals of the tracks are statistically independent, this term is zero.

Likewise, the last term represents the intercorrelation of the noise and of the signal. If the noise is independent of the signal, this term is zero.

The second term represents the autocorrelation of the signal of the track i−1. This is the energy of the signal over n samples. It is constant on average, and we will take it to be equal to 1 by convention. Thus $$C_{i,i-1} = \frac{1}{N} \sum \frac{d}{w} \cdot a_{i-1(k)} \cdot a_{i-1k} \approx \frac{d}{w}$$

In the case shown in the figure, $C_{i,i+1}$ is zero. If the separation of the detector with respect to the tracks is in the other direction, $$C_{i,i-1} = 0$$

$$C_{i,i+1} \approx \frac{d}{w}$$

It is therefore possible to extract a position error signal based on the signals of the track i:

$$C_{i,i-1} - C_{i,i+1} \approx \frac{d}{w}$$

In order to improve the quality of this signal, it is advantageous to carry out this calculation for each of the tracks, and to take the average of the results $$\frac{d}{w} \approx \frac{1}{p} \sum [C_{i,i-1} - C_{i,i+1}]$$

According to the invention, the calculation is carried out directly, in order to overcome the response time and rounding off restrictions for optimum operation of the cross-talk corrector.

At time k:

$$\overset{\circ}{a}(k) = \frac{1}{p} \sum_i C_{i,i-1}(k) - C_{i,i+1}(k)$$

$$C_{i,i-1} = \frac{1}{N} \sum_k x_{i(k)} \cdot a_{i-1(k)}$$

The signals $a_{i(k)}$ recorded on the tracks are approximated by the sign of the samples reread on this track. A simplified decoding of the signal is thus carried out. The benefit of this simplified decoding is that it is not necessary to wait for the convergence of the various devices for processing the signal that is generally found in the read channel (adaptive equalizer, PLL, etc.) to make the decoded signal available. The approximation only generates excess noise in the position error estimate:

$$C_{i,i-1} \# \frac{1}{N} \sum_k x_i(k) \cdot \mathrm{sgn}(x_{i-1}(k))$$

hence:

$$\overset{\circ}{a}(k) = \frac{1}{NP} \sum_i \sum_k [x_i(k) \cdot \mathrm{sgn}(x_{i-1}(k)) - x_i(k) \cdot \mathrm{sgn}(x_{i+1}(k))]$$

or else:

-continued $$\overset{\circ}{a}(k) = \frac{1}{NP} \sum_i \sum_k x_i(k) \cdot [\text{sgn}(x_{i-1}(k)) - \text{sgn}(x_{i+1}(k))]$$

This last form makes it particularly easy to insert the algorithm.

Figure 4:
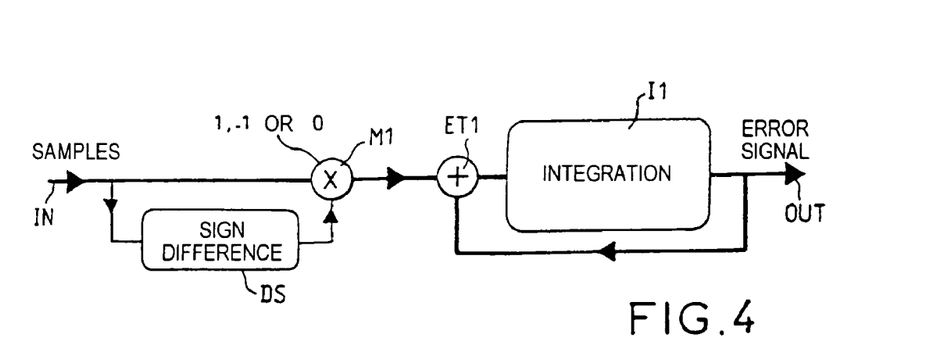
FIG. 4, a general exemplary embodiment of a circuit for detecting the relative position of tracks of a recording medium with respect to a detection device.

FIG. 4 shows a simplified exemplary embodiment of the relative positioning circuit DTR.

This circuit receives at its input IN the data samples transmitted on the series output of the CCD of the detection device TL6. Each successive sample is transmitted to a multiplier M1 where it is multiplied by a factor 1, −1 or 0 supplied by the circuit DS depending on the signs of the adjacent samples.

The samples multiplied in this way are integrated in an integration circuit I1. The output OUT of the integrator supplies an error signal making it possible to correct the relative position error of the detection device with respect to the tracks.

The circuit DS makes it possible to determine the cross-talk correction multiplication factor K for each sample. For a sample $x_i$, this factor K takes one of the values −1, +1 or 0 by applying the following table:

| Value of the factor K | Sign of the sample $x_{i-1}$ | Sign of the sample $x_{i+1}$ |
| --- | --- | --- |
| −1 | >0 | <0 |
| +1 | <0 | >0 |
| 0 | >0 | >0 |
| 0 | <0 | <0 |

It can therefore be seen that if the samples have the same sign, the factor K is zero. If they have opposite signs, the factor K has the value +1 or −1 as indicated by the table.

Figure 5:
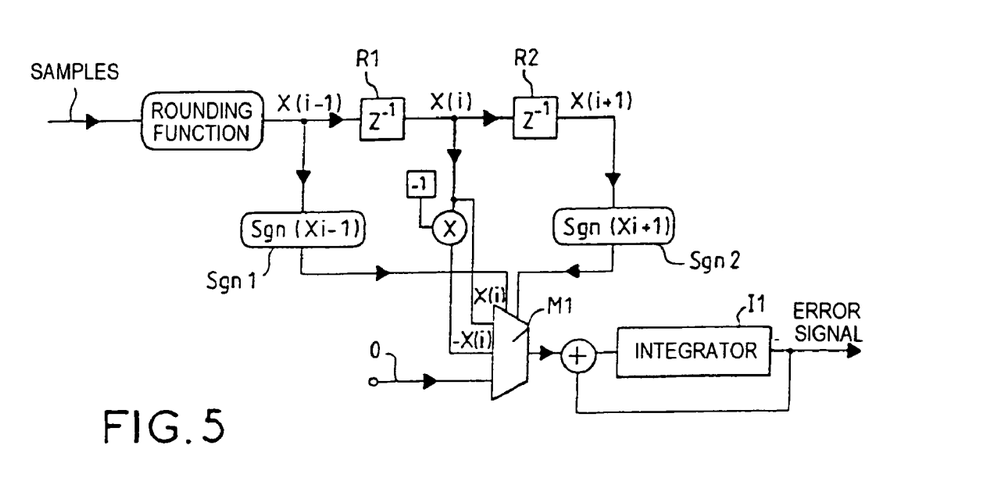
FIG. 5, a detailed exemplary embodiment of the circuit of FIG. 4.

FIG. 5 shows a detailed exemplary embodiment of the DTR circuit.

This circuit comprises two delay circuits R2 with equivalent delays making it possible to transmit at the same time as a sample $x_i$, the previous sample $x_{i-1}$ and the following sample $x_{i+1}$ to the multiplier M1. The sample $x_i$ is transmitted to the multiplier M1, firstly, as it is and, secondly, multiplied by −1. With regard to the samples $x_{i-1}$ and $x_{i+1}$, only the signs of these samples are transmitted by the circuits sgn1 and sgn2. The circuit M1 also receives a signal representing the value 0 of a sample. The circuit M1 is designed to compare the signs of the samples $x_{i-1}$ and $x_{i+1}$ and to control, by applying the above table, the transmission on the output of the circuit M1, that is the signal $+x_i$, or the signal $-x_i$ or the signal 0.

The processing carried out on the successive samples contained in the CCD of the detection device TL6 are integrated into the integrator I1.

The data samples from the different tracks detected at a particular time and contained in the CCD register of the detection device are therefore processed one after the other as has just been described and the results of the processing are integrated into the integrator I1. Next, the samples from the different tracks detected at the subsequent times are processed in the same way and integrated after the previous ones. The integration can be carried out in the same integrator I1.

The depth of the integrator depends on the mean amplitude of the samples, on their rate, and on the desired response time. By way of indication, for a rate of 15 million samples per second, a depth of about 20 bits makes it possible to obtain a bandwidth of the control loop of about 30 Hz in order to obtain a short lock-on time without being detrimental to the accuracy of the system in normal operation, it is possible to change the time constant between the lock-on mode and the track-following mode.

The error signal coded over 8 bits consists of the high-weight bits of this integrator. It is then converted to an analog quantity, filtered then adapted to the control of the electromagnetic motor.

The result of the integration makes it possible to control the adjustment of the position of the detection device with respect to the tracks of the tape, or, which amounts to the same thing, in the case of optical reading of the tracks, to adjust the deflection of the read beam towards the detection device. Since the detectors of the detection device are adjusted virtually on the centers of the tracks, the numbers of the tracks read should then be identified.

Figure 6:
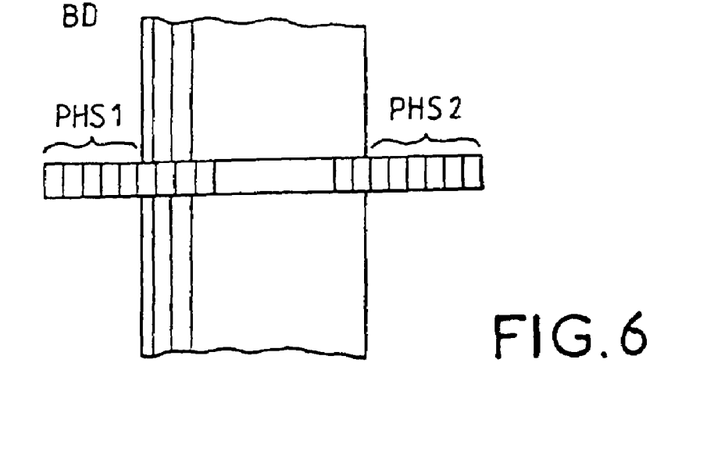
FIG. 6, a detection device combined with a multitrack recording medium.

The relative position detection circuit DTR enabling the position of the detectors to be adjusted with respect to the centers of the tracks read will now be described. However, as has also been seen (FIG. 2), the detection device comprises a greater number of detectors than there are tracks. Nevertheless, all the detectors are taken into account in reading. It is therefore necessary to detect the detectors PHS1 and PHS2 which are not used in reading the tracks (FIG. 6). The absolute position detection circuit DTA makes it possible to detect these detectors and to identify the detector corresponding to the first track, that corresponding to the second track, etc.

According to the invention, zones called preamble zones, containing signals of particular characteristics in order to detect the tracks, are provided here and there on the recording medium.

In this preamble zone, at least some tracks, or even all the tracks, contain identification data making it possible to indicate the number of the tracks.

Under these conditions, after having positioned the detection device with respect to the tracks, the detectors which read identification data make it possible to identify the numbers of the tracks which they read.

The system therefore identifies, on the one hand, the detectors used for reading tracks and the numbers of the tracks that they read.

A method preferred according to the invention is to impose the signals having a positive or negative continuous component depending on the tracks, in the preamble zone.

Moreover, these signals will preferably have characteristics required by other considerations. For example, it is desirable that these signals have little track-to-track correlation so as not to cause the malfunction of the relative position detection circuit DTR. Moreover, they must be capable of being transmitted and exploited correctly by the system (spectral characteristics adapted to the channel, probability of transitions allowing the proper operation of the phase locked loop). For example, one method consists in using, for this region, pseudo-random signals coded according to the 8/10 modulation code or a set of specific words of this code, with alteration of the coding. In this system, only the preamble zone is affected by this coding. A variant may consist in keeping this code in the data zones, if the 8/10 code is used in the data zone.

The 8/10 code with a zero continuous component has a certain number of code words with a nonzero continuous component (DC=±2). The normal use of this code provides that a word with a positive continuous component must be followed by a word with a negative continuous component. If this rule is violated systematically or periodically, a nonzero continuous component is generated on the corresponding track. The integral of this continuous component is generally called DSV (Digital Sum Value). The idea is to make the DSV of each track moderately increasing or decreasing according to a pattern defined for all the tracks and thus to create an absolute track reference. On reading, the increasing DSV tracks are then distinguished from the decreasing DSV tracks. On writing, the DSV of the tracks are made alternately increasing over n tracks then decreasing over n following tracks.

This leads to a modification qualified as "alteration" on the algorithm of the initial coding. "Modulation of the DSV" will also be mentioned in order to qualify an increasing or decreasing variation thereof.

The method for making a DSV increasing consists in not compensating a word coded DC=+2 with a word coded DC=−2 and of altering the DSV by therefore authorizing two consecutive words coded DC=+2. To make the DSV decreasing, it is enough, in contrast, to twice compensate a word coded DC=+2 by a word coded DC=−2 and therefore to authorize two consecutive words coded with DC=−2. It is also possible to systematically violate the encoding rule, which generates a stronger continuous component at the cost of a greater decoding penalty, if the continuous component is not reconstructed.

In order to evaluate the continuous component on a track, the series of decoded bits on this track are integrated for a given time, and it is examined whether the result is positive or negative.

Rather than integrate the decoded bits track by track, it is possible to make the correlation between the expected result and the result which is actually observed.

For example, for an alteration of an 8-track period DSV, that is to say 4 consecutive positive DSV tracks and 4 consecutive negative DSV tracks, the algorithm is as follows:

$$S1 = \text{sum } [(b_0 + b_1, + b_2 + b_3) - (b_4 + b_5 + b_6 + b_7)]$$

$$S2 = \text{sum } [(b_2 + b_3 + b_4 + b_5) - (b_6 + b_7 + b_0 + b_1)]$$

where $b_i$ represents the signal samples of the track i modulo 8.

Figure 7:
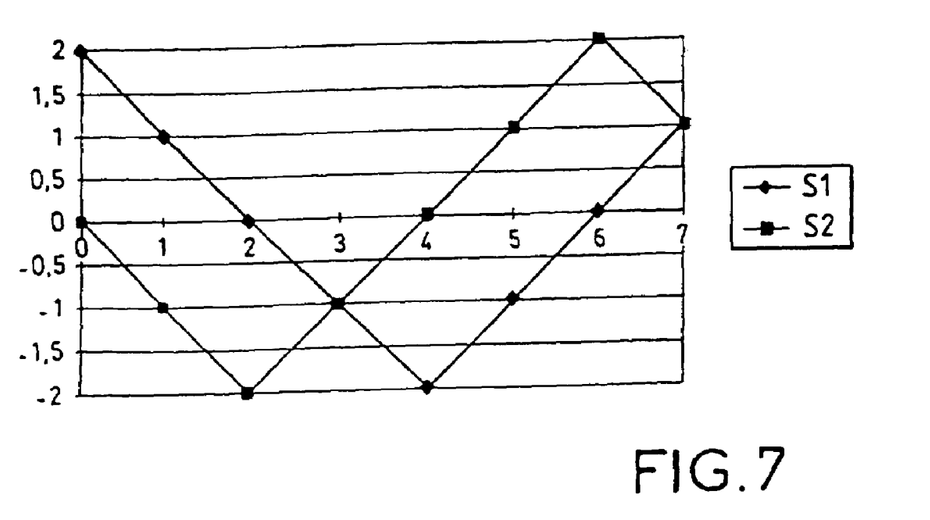
FIG. 7, an organizational example of an absolute track-following system according to the invention.

The value taken by S1 and S2 depending on the position of the tracks is represented in FIG. 7.

It is then possible to calculate from the values of S1 and S2, by means of a correspondence table, the difference in position of the tracks with respect to their theoretical position. A table of this sort is as follows:

| | | | S1 | | | |
|---|---|---|---|---|---|---|
| S2 | −2 | −1 | 0 | 1 | 2 |
| −2 | | | 2 | | | |
| −1 | | 3 | | | | |
| 0 | 4 | | | | 0 | |
| 1 | | 5 | | 7 | | |
| 2 | | | 6 | | | |

Conversely, having calculated the values of S1 and S2, the shift of the tracks is thereby calculated.

In order to reduce the probability of error, it will be possible to normalize the values taken by S1 and S2 by noting that |S1|+|S2|=constant.

It is therefore possible, by modulating the 8-track period DSV, to obtain data on the position of the modulo 8 tracks. If a larger range is required without uncertainty, it will be possible to increase this period.

Figure 8:
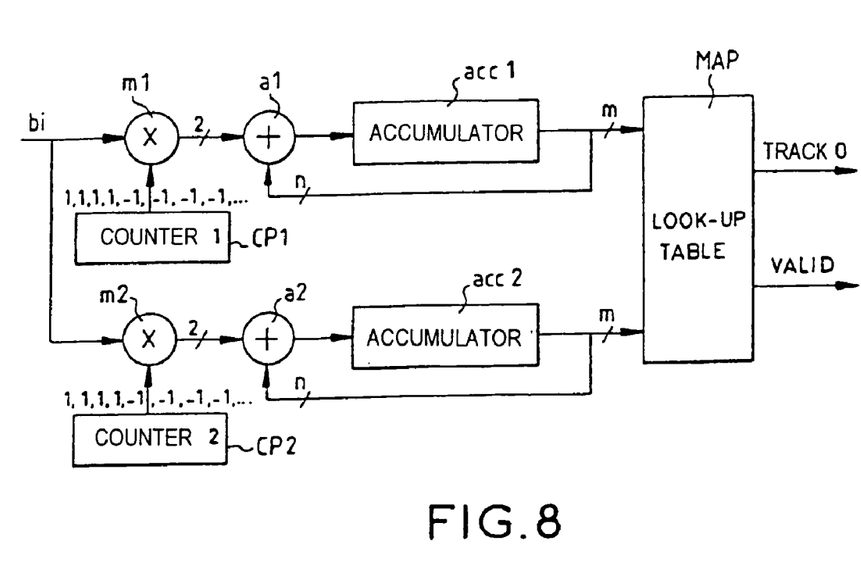
FIG. 8, an example of a circuit making it possible to implement an absolute track-following control circuit according to the invention.

A circuit carrying out this function is shown in FIG. 8.

Use of Any Code Words

In the following, it is supposed that the code words are chosen randomly, but that a systematic violation of the encoding rule is applied according to the tracks.

The code comprises 256 words, of which 103 are with a nonzero DSV (DS=+2 or −2). For an equiprobable message, the probability of occurrence of a nonzero DSV word is therefore 103/256. On average, the DSV of this sequence is:

$$+2*103/256=0.805$$

while the number of corresponding channel symbols is 10.

The continuous component generated by the code violation is then 0.08. This continuous component barely penalizes the operation of the system, and in particular the decoding (0.72 dB). The noise on the error signal can be evaluated as follows:

For a measurement frequency of B=100 Hz, the number of symbols processed per integration period 1/B:

$$n=D/B$$

where D is the raw bit rate.

The fluctuation of the contents of the integrator is Vn.

Typically, on a 64 track application, D=10 Mb/s and Vn=316.

In the case of a track difference, the error signal is then, over the same period:

$$0.08*D/B=8000$$

That is, an S/N of 29 dB.

The optimum depth of the accumulator remains to be evaluated. It depends on the desired detection time.

Use of Particular Code Words

In a preamble, it is possible to provide specific code words. In particular, it is possible to only use nonzero DSV words, which makes it possible to gain a factor 256/103 =2.5, that is an improvement of 8 dB on the S/N, with, however, a substantial increase in the penalty on the decoding (2 dB), which does not pose a problem in this preamble zone.

Use of Words not Belonging to the Code Table

It is quite possible to choose words not belonging to the 8/10 code, and to combine them within the track and between tracks, in order to optimize the overall operation of the system.

Other Modes for Detecting the Position of the Tracks

It is also possible to use other means for identifying the tracks, for example, a specific signal (pure frequency or single sequence) over one or more tracks. The criteria for choosing between solutions are the robustness (generally better if the detection is carried out on a set of tracks) and simplicity of implementation.

Exploitation of the Absolute Position Signal

The detection system delivers a position signal (flag) of at least one track, for example the zero track, in synchronism with the decoded bits of this track (FIG. 2). This data is used by the system for rearranging data (deformatting electronics) in order to retain only the data corresponding to the tracks actually written (80/96 in our example).

What is claimed is:

1. A system for reading a magnetic medium having several tracks of data which can be read in parallel, and comprising a detection device having at least as many detectors as there are tracks, making it possible to read simultaneously and at regular intervals a sample of data on each track, said detection device having a parallel/series shift register receiving in parallel the samples of data read by the detectors at each read time and retransmitting them in series form, the system comprising:
   a processing circuit configured to receive the sample of data to be processed from each track, together with a sample of data from a first adjacent track and a sample of data from a second adjacent track, and to calculate a cross-talk affecting the sample of data to be processed due to the adjacent tracks;
   an integration circuit configured to receive and integrate the cross-talk, obtained at each read time and at subsequent read times; and
   a relative track-following control circuit configured to receive a result of integration of the integrator circuit (I1) and to supply a track-following control signal for the detection device, wherein said processing circuit comprises means for multiplying the value of the sample to be processed by +1 when the sample of the first adjacent track is negative and the sample of the second adjacent track is positive, by −1 when the sample of the first adjacent track is positive and the sample of the second adjacent track is negative, or by 0 when the samples of the adjacent tracks are of the same sign.

2. The system as claimed in claim 1, wherein the data medium is read using a light beam transmitted to the detection device after reading the data medium, and the relative track-following control circuit is configured to control a device for deflecting the light beam depending on the position of the detection device.

3. The system as claimed in claim 1, wherein the detection device comprises a greater number of detectors than there are tracks to read and the detection device further comprises:
   an absolute position detection circuit configured to identify the track read by each detector of the detection device; and
   a central control circuit configured to control the operation of said processing circuit, said integration circuit, said relative track-following control circuit, and the absolute position detection circuit.

4. The system as claimed in claim 3, further comprising:
   means for identifying, in the date reach by each detector, one or more track identity data items.

5. The system as claimed in claim 4, wherein the tracks of the data medium comprise preamble zones containing identification data.

6. The system as claimed in claim 5, wherein the preamble zones of the various tracks can be read simultaneously.

7. The system as claimed in claim 6, wherein the preamble zones have components which are positive or negative depending on the tracks, and a circuit is provided configured to detect the tracks with positive continuous components and those with negative continuous components.

8. The system as claimed in claim 7, wherein the tracks of the recording medium are distributed in alternating groups of positive and negative components.

9. The system as claimed in claim 8, wherein groups of four tracks of positive components which alternate with groups of four tracks of negative components comprise:
   a first summation circuit configured to add the signs of the samples detected by a first group of four detectors and the inverse of the signs detected by a second group of four detectors;
   a second addition circuit configured to add the signs of the samples detected by the first two detectors of the first group of detectors and the last two detectors of the second group and the inverse of the signs of the samples detected by the other detectors of these groups; and
   a table indicating the numbers of the tracks detected by said detectors according to the results of the additions carried out by the addition circuits.

* * * * *